United States Patent
Stiesdal

(10) Patent No.: US 8,200,435 B2
(45) Date of Patent: Jun. 12, 2012

(54) METHOD AND ARRANGEMENT FOR THE FORECAST OF WIND-RESOURCES

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 428 days.

(21) Appl. No.: 12/506,487

(22) Filed: Jul. 21, 2009

(65) Prior Publication Data
US 2010/0023266 A1  Jan. 28, 2010

(30) Foreign Application Priority Data
Jul. 22, 2008 (EP) .................................... 08013205

(51) Int. Cl.
*G01W 1/02* (2006.01)
*G01B 5/18* (2006.01)
(52) U.S. Cl. ............. 702/3; 700/284; 700/291; 702/142; 702/166
(58) Field of Classification Search ................ 702/3, 96, 702/99, 104, 130, 132, 142, 166; 700/284, 700/286, 287, 291; 705/37; 73/384
See application file for complete search history.

(56) References Cited

U.S. PATENT DOCUMENTS

| | | | |
|---|---|---|---|
| 6,975,925 B1 | 12/2005 | Barnes et al. | |
| 7,228,235 B2 | 6/2007 | Grzych et al. | |
| 7,403,854 B1 | 7/2008 | Hurley et al. | |
| 7,430,458 B2 * | 9/2008 | Dansereau et al. | 700/284 |
| 2002/0194113 A1 | 12/2002 | Lof et al. | |
| 2008/0091307 A1 * | 4/2008 | Dansereau et al. | 700/284 |
| 2008/0195255 A1 * | 8/2008 | Lutze et al. | 700/291 |

FOREIGN PATENT DOCUMENTS

| | | |
|---|---|---|
| JP | 2005163608 A | 6/2005 |
| JP | 2007233039 A | 9/2007 |

OTHER PUBLICATIONS

P. Pinson et al., "Wind Power Forecasting Using Fuzzy Neural Networks Enhanced with On-Line Prediction Risk Assessment", Preceedings of IEEE Power Tech Conference, Jun. 23, 2003, pp. 8, pp., XP008074043.

* cited by examiner

*Primary Examiner* — John H Le

(57) ABSTRACT

A method and an arrangement for a forecast of wind-resources of a wind-farm are provided. The forecast is done by a numerical weather-prediction-tool, the weather-prediction-tool using a long-term data-set of meteorological data. The data are related to the location of the wind-farm. A wind-speed measurement is done by a wind-turbine of the wind-farm to do a parameterization of an atmospheric turbulence. The wind-speed measurement is used to generate a data-stream, which is combined with the data-set of the meteorological data to do the forecast.

18 Claims, 1 Drawing Sheet

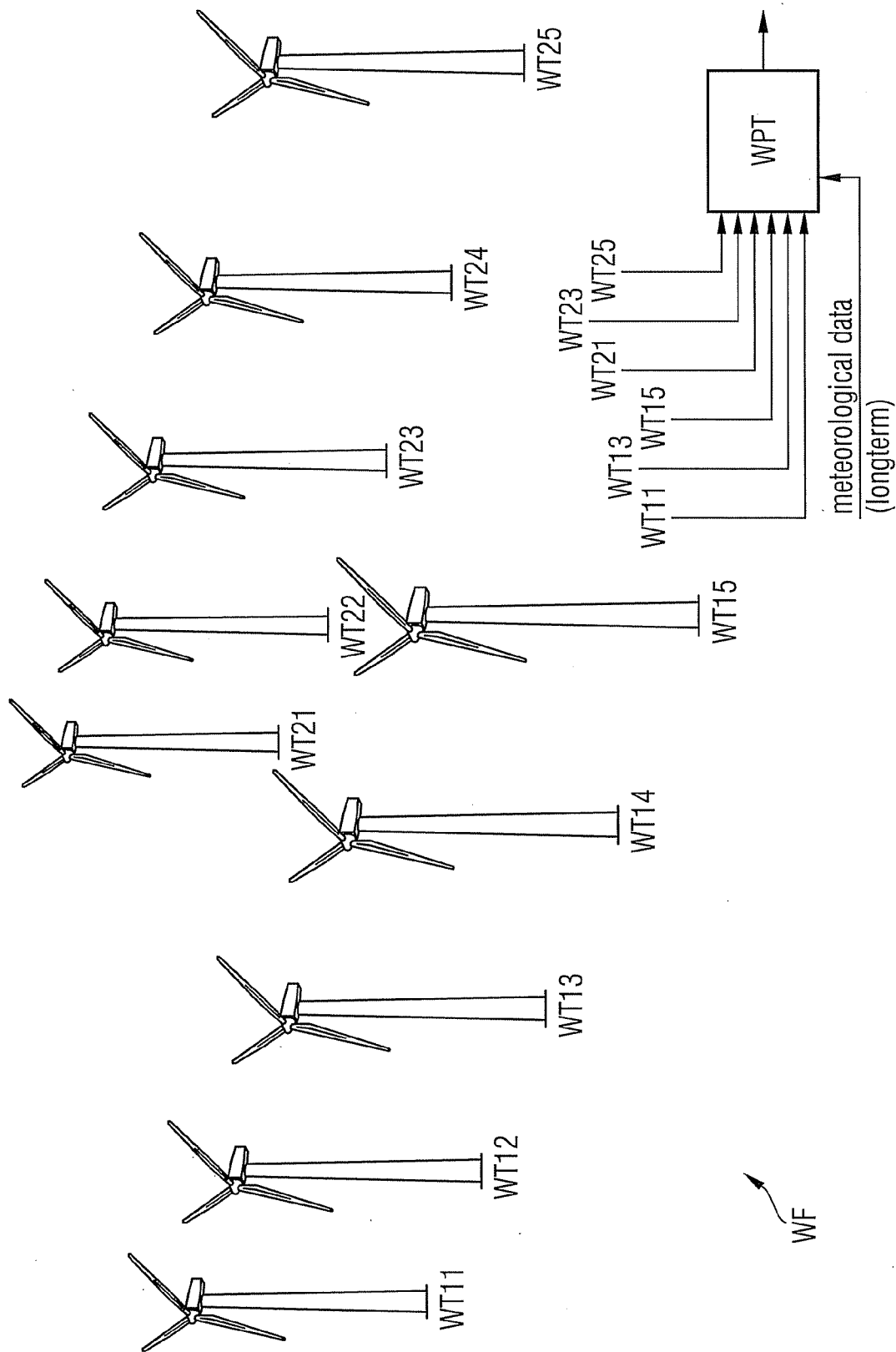

METHOD AND ARRANGEMENT FOR THE FORECAST OF WIND-RESOURCES

CROSS REFERENCE TO RELATED APPLICATIONS

This application claims priority of European Patent Office Application No. 08013205.3 EP filed Jul. 22, 2008, which is incorporated by reference herein in its entirety.

FIELD OF INVENTION

The invention relates to a method and an arrangement for the forecast of wind-resources and for the forecast of an output, too, of a commercially operated wind farm.

BACKGROUND OF INVENTION

The forecast of wind resources and so to forecast a wind-farm output-power will improve the ability, to commit specific power-production from a wind farm.

Consequently, an accurate forecast is needed to improve the value of wind power. This could pave the way for a higher penetration with wind-farms, too, than it is now.

There are numbers of concepts to forecast the wind-resources and the output-power of a wind-farm. They are based on a traditional numerical weather prediction by tools at a mesoscale level—"Mesoscale Meteorology" is the study of weather systems, which are smaller than synoptic scale systems but larger than microscale and storm-scale cumulus systems.

However experience shows that the accuracy of this kind of models is not sufficient for power-output commitments that could be associated with high penalties.

The U.S. Pat. No. 7,228,235 discloses an enhanced method for the forecast, where public available long-term data-sets of locations are considered, which are near to a planned wind-farm location. A test-tower is located at the potential new location being used to collect more short-term data-sets. The long-term data sets and the short-term data-sets are combined to be used by a computer-learning-system. So it is possible to predict Long-term data-sets for the potential wind-farm location.

SUMMARY OF INVENTION

Objects of the invention are to provide an improved method and arrangement for the forecast of wind-resources and for the forecast of an output-power of a wind-farm.

These objects are achieved with a method and an arrangement as claimed in the independent claims.

Preferred embodiments of the invention are subject of the dependent claims.

For the forecast it is necessary to do a high-resolution numerical weather prediction at a level being relevant for the operation of wind-turbines. This level is the atmospheric boundary layer, so a parameterization of atmospheric turbulences for this level is needed.

This parameterization is one of the largest sources of error for the high-resolution numerical weather prediction, so a correct parameterization will be a key requirement for any tool to be used for the forecast.

According to the invention necessary parameterization of turbulence is derived by the use of a unique feature of a modern wind-farm: it is derived from a wind-speed measurement, which is done preferably at each wind-turbine of the wind-farm.

This wind-speed measurement is done continuously and in "real-time" at a certain height of the wind-turbine—preferably the height of the hub of the wind-turbine.

This will result in a real-time data-stream comprising wind-speed-measurements, done at the hub-height, from a significant number or from all wind-turbines of the wind-farm.

These measurements are combined with other meteorological data, measured at the wind-turbine.

Especially the combination of relevant data of all wind-turbines across the wind-farm is used for the forecast.

This data is fed to a numerical weather prediction model, leading to a significantly improved forecast for the wind-farm.

In a preferred embodiment wind-speed-measurements at other certain heights are used additionally. These measurements might be provided from one or more meteorological masts located within the wind-farm. Because of this it is possible, to describe the local wind-shear.

In a preferred embodiment the air temperature is measured for at least two different heights to provide information for the assessment of atmospheric stability.

If the wind farm is located offshore it is a preferred embodiment to measure even the sea temperature.

The inventive method delivers a significant better forecast-quality, if spatially distributed wind-turbines are used to do the speed-measurements described above. This adds one or more additional dimensions to the wind-speed measurements of the wind-farm.

If the wind-farm consists of a single line of wind-turbines, the wind-speed measurements at the hub-height are done from several or from substantially all wind-turbines. This leads to a more precise description of turbulence, because one more dimension is added to the typical single-point wind-speed measurement.

If the wind-farm consists of wind-turbines being located at an area, the wind-speed measurements at hub-height are done from several or from substantially all wind-turbines. This leads to a more precise description of turbulence, because it adds two more dimensions to the typical single-point wind-speed measurement.

Measuring at different heights adds additional dimensions if needed.

The measured wind-speed-data and the other meteorological data are transferred to a computer-system, to be used for a numerical weather prediction model.

The data are used to calibrate the numerical weather prediction model. So real-time data for the parameterization of the turbulence are available and can be used together with stability elements of the prediction model.

So a continuous adjustment and calibration of the model is enabled.

It is also possible to use the provided data for a correlation with historical predictions, advantageously used to be fed into a learning computer-system.

If the predicted wind-speed is combined with the assigned power of the wind-farm as a function, the total power output of the wind-farm can be predicted accurately.

The quality of the forecasting is improved in a preferred embodiment by combining the data of a first wind-farm with data of a second wind-farm, which is located at another place.

The first and the second wind-farm should be located within a certain area, for which the same numerical weather prediction model can be used.

The quality of the forecasting is improved in a preferred embodiment by adding of non-wind-farm-related meteorological measurements to the data-stream, for example by adding of data from nearby synoptic stations.

The quality of the forecasting may be further improved by adding information from satellite-based wind-speed measurements.

The output prediction may be adjusted by combining information which are related to the downtime of used wind-turbines, and/or by combining information which are related to wind-turbines being operated in so called "partly curtailed mode", etc.

The inventive method is implemented in a preferred embodiment as a so called "add-on-feature" to control-software and/or to monitoring-software of new or of already existing wind-farms.

So owners are provided with useful additional resources to improve their forecast without the need of a great amount of additional costs.

BRIEF DESCRIPTION OF THE DRAWINGS

The invention is described in more detail with help of a drawing.

FIG. 1 shows a wind-farm for the forecast of wind-resources.

DETAILED DESCRIPTION OF INVENTION

FIG. 1 shows a wind-farm WF with lined-up wind-turbines WT11 to WT15 and WT21 to WT25 to be used for the invention.

A forecast of wind-resources of the wind-farm WF is done by a numerical weather-prediction-tool WPT, where the weather-prediction-tool WPT uses a long-term data-set of meteorological data. The meteorological data are related to the location of the wind-farm WF.

A wind-speed measurement is done by at least one of the wind-turbines of the wind-farm WF. In this example a wind-speed measurement is done by six wind-turbines WT11, WT13, WT15, WT21, WT23 and WT25.

The wind-speed measurements are delivered to weather-prediction-tool WPT, where they are used to do a parameterization of atmospheric turbulences.

They are used as additional data to be combined with the data-set of the meteorological data. Based on this data-combination the forecast is done in a precise manner.

The invention claimed is:

1. A method of determining a forecast of wind-resources of a wind-farm, comprising:
   receiving a long-term data-set of meteorological data which are related to a location of the wind-farm;
   generating a short term data-stream having multiple dimensions by measuring wind-speeds a at a plurality of spatially distributed wind-turbines of the wind-farm and at a plurality of heights for each wind-turbine for a parameterization of an atmospheric turbulence; and
   generating a forecast via a numerical weather-prediction-tool by combining the data-stream with the data-set of the meteorological data in order to determine the forecast.

2. The method according to claim 1, wherein the wind-speed is measured continuously in real-time.

3. The method according to claim 1, wherein the wind-speed is measured at a height of a hub of the wind-turbine.

4. The method according to claim 2, wherein the wind-speed is measured at a height of a hub of the wind-turbine.

5. The method according to claim 1, wherein a substantially all of the wind-turbines of the wind-farm perforin wind-speed measurements, the wind-speed measurements contributing to the short term data-stream.

6. The method according to claim 2, wherein one or more meteorological masts additionally measure the wind-speed, the meteorological masts being located within the wind-farm.

7. The method according to claim 2, wherein an air-temperature is measured for at least two different heights in order to provide an additional meteorological information for an assessment of atmospheric stability.

8. The method according to claim 2, wherein a sea-temperature is additionally measured for an offshore wind-farm as additional meteorological data.

9. The method according to claim 2, further comprising:
   transferring the wind-speed-measurement and the meteorological data to a computer-system for modeling a numerical weather prediction.

10. The method according to claim 9, wherein historical weather predictions are additionally used for modeling the numerical weather prediction.

11. The method according to claim 2, wherein a predicted wind-speed is combined with an assigned power of the wind-farm as a function for predicting a total power output of the wind-farm.

12. The method according to claim 2, wherein the meteorological data and wind-speed-measurements of a plurality of wind-farms are used to do the forecast, the wind-farms being located within an area for which the same numerical weather prediction model is used.

13. The method according to claim 2, wherein non-wind-farm-related meteorological measurements are used additionally to the meteorological data and the wind-speed-measurements to determine the forecast.

14. The method according to claim 2, wherein information from a satellite-based wind-speed measurement are used additionally to determine the forecast.

15. The method according to claim 2, wherein information, which are related to a downtime of used wind-turbines, are used additionally to determine the forecast and/or information, which are related to wind-turbines being operated in a partly curtailed mode, are used additionally to determine the forecast.

16. An arrangement for determining a forecast of wind-resources of a wind-farm having a plurality of wind turbines, comprising:
   a numerical weather-prediction-tool for determining the forecast, the weather-prediction-tool using a long-term data-set of meteorological data which are related to a location of the wind-farm;
   a measuring tool for measuring wind-speeds for a parameterization of an atmospheric turbulence, the measuring tool being arranged at a plurality of spatially distributed wind-turbines and at a plurality of heights for each wind-turbine to generate a short term data-stream having multiple dimensions; and
   a computer-system for modeling a numerical weather prediction using the short term data-stream and the long-term data-set of meteorological data.

17. The arrangement according to claim 16, further comprising:
   meteorological masts located within the wind-farm for additionally measuring the wind-speeds.

18. The arrangement according to claim 16, wherein substantially all of the spatially distributed wind-turbines are used for measuring the wind-speed.

* * * * *